United States Patent Office

2,763,535
METHOD OF PREPARING SULFAMIC ACIDS FROM CARBAMIC ESTERS

Theodore I. Bieber, Kew Gardens, N. Y.

No Drawing. Application August 12, 1953,
Serial No. 373,889

9 Claims. (Cl. 260—500)

The present invention relates to a method of preparing sulfamic acids from carbamic esters and, more particularly, it relates to a method of preparing sulfamic acids by reacting carbamic esters with oleum.

I have found that if oleum having a relatively high sulfur trioxide content is reacted with carbamic esters of the general formula $$RNHCOOR'$$

where R is a member of the class consisting of hydrogen or an alkyl group which is not appreciably sulfonated, sulfated or oxidized by oleum under the conditions of the process, and where R' is a primary or secondary alkyl group, that sulfamic acids of the general formula $$RNHSO_3H$$

will be produced.

Accordingly, it is an object of the present invention to provide a method of preparing sulfamic acids of the formula $$RNHSO_3H$$

from carbamic esters.

Another object of the present invention is to provide a method of the above described character which is simple to perform and control and which gives desirable yields of sulfamic acids.

Other objects and advantages of the present invention will become more apparent as it is described in detail below.

In carrying out my process with varying types of carbamic esters, I noted that amine or ammonium bisulfates frequently accompanied the formation of the sulfamic acids. The amount of amine or ammonium bisulfate produced varied with the particular ester and with the percentage of sulfur trioxide in the oleum used. In order to eliminate or minimize the formation of the amine or ammonium bisulfates, it is necessary (1) to employ an oleum having a sulfur trioxide content of not appreciably less than 30% and (2) to control the temperature of the reaction so that it never considerably exceeds that temperature required for evolution of carbon dioxide. In fact, where the oleum has a sufficiently low sulfur trioxide content, it is possible that no sulfamic acids will be formed and that amine or ammonium bisulfates will be the only nitrogen bearing products.

Of course, it is obvious that the temperature required for the reaction to occur (as evidenced by the evolution of carbon dioxide) differs with the sulfur trioxide content of the oleum and with the nature of the carbamic ester. However, in order to control the temperature of the reaction as prescribed above, it is most advantageous to mix the oleum and carbamic ester slowly in an ice cooled vessel and then to gradually raise the temperature until carbon dioxide is evolved.

It was noted that with greater sulfur trioxide content of oleum, evolution of carbon dioxide will occur at a lower temperature. Also, if the R' radical of the carbamic ester is a primary alkyl group, the temperature at which carbon dioxide evolves is considerably higher than if R' is a secondary alkyl group.

In carrying out my process, I also discovered for any given sulfur trioxide content of oleum and with similar molar ratios of carbamic ester to oleum, that higher yields of sulfamic acids were obtained where the R group of the carbamic ester is an alkyl radical rather than a hydrogen atom.

A higher oleum to ester ratio also tends to favor the formation of a sulfamic acid since more sulfur trioxide is provided.

It is true that while carbon dioxide evolution occurs at much lower temperatures if R' is a secondary alkyl radical rather than a primary alkyl radical, considerably more amine or ammonium bisulfates are formed if R' is a secondary rather than a primary alkyl radical. Thus, higher yields of sulfamic acids are obtained if the R' group of the carbamic ester is a primary alkyl radical rather than a secondary alkyl radical.

Below is a table illustrating the above discussed generalizations that I detected. This table is based on a series of reactions between oleum and carbamic esters that were carried out as follows: In each case, carbamic ester was slowly added to ice cooled and mechanically stirred oleum. The mixture was then slowly heated on a water bath until vigorous evolution of carbon dioxide occurred except where carbon dioxide evolution occurred in the cold mixture. When carbon dioxide gas ceased to evolve, the reaction mixture was ice cooled and poured on ice. The sulfamic or alkyl sulfamic acid content of the resulting aqueous solution was then determined.

TABLE 1

| RNHCOOR' | | | Oleum | | RNHSO$_3$H | |
|---|---|---|---|---|---|---|
| R | R' | g. | Wt. percent free SO$_3$ | g. | Reaction temp., °C. | R | Yield, percent |
| H | C$_2$H$_5$ | 5.0 | .5 | 20.0 | 80-90 | H | 0 |
| H | C$_2$H$_5$ | 5.0 | 30 | 23.0 | 70-80 | H | 23 |
| H | C$_2$H$_5$ | 5.0 | 60 | 22.6 | 60-70 | H | 51 |
| H | C$_2$H$_5$ | 5.0 | 60 | 50.0 | 60-70 | H | 69 |
| H | n-C$_5$H$_{11}$ | 7.4 | .5 | 20.0 | 80-90 | H | 0 |
| H | s-C$_4$H$_9$ | 6.6 | .5 | 20.0 | 0-10 | H | 0 |
| H | s-C$_4$H$_9$ | 6.6 | 30 | 23.4 | 0-10 | H | 12 |
| H | s-C$_4$H$_9$ | 6.6 | 60 | 26.4 | 0-10 | H | 22 |
| H | C$_6$H$_5$CH$_2$ | 8.4 | .5 | 40.0 | 0-10 | H | 0 |
| C$_2$H$_5$ | C$_2$H$_5$ | 6.6 | .5 | 20.0 | .90 | C$_2$H$_5$ | 6 |
| C$_2$H$_5$ | C$_2$H$_5$ | 6.6 | 30 | 23.0 | 70 | C$_2$H$_5$ | 85 |
| C$_2$H$_5$ | C$_2$H$_5$ | 6.6 | 60 | 25.5 | 60 | C$_2$H$_5$ | 93 |
| CH$_3$ | C$_2$H$_5$ | 5.8 | 60 | 26.4 | 60 | CH$_3$ | 94 |

The particular method employed for isolating the formed sulfamic acids from the reaction mixture depends primarily upon the particular sulfamic acid involved and on the amount of contamination by ammonium or amine bisulphates. For example, if unsubstituted sulfamic acid should be appreciably present in the reaction mixture, it will crystallize out of solution in the reaction mixture and it may then be removed by filtering the cooled mixture. Because the unsubstituted sulfamic acid has a low solubility in an aqueous solution of high sulfuric acid content, it is preferable to pour the reaction mixture onto ice to insure more complete precipitation of the acid.

If mono-substituted sulfamic acids are formed in high yield in the process, then in order to obtain the fairly pure crystalline mono-substituted sulfamic acids, it is only necessary to dilute the reaction mixtures in a cooled condition with limited quantities of ether and then filter the precipitated sulfamic acids from the mixture. Care should be utilized in selecting the amount of ether used because any amine bisulfates present will separate out as hygroscopic oils in the presence of large quantities of ether.

In the event these methods of isolation are inadequate to obtain a fairly pure crystalline sulfamic acid, I then recrystallize the sulfamic acid from a suitable solvent or solvent mixture. If the recrystallization is still inadequate to obtain a pure sulfamic acid, I then use lead oxide to purify the product. This lead oxide method of purification is described in my co-pending patent application, Serial No. 373,890, filed August 12, 1953.

Below are several examples which illustrate but in no way restrict my invention.

Example 1

5.0 g. of ethyl carbamate were added gradually to 26 ml. (about 50 g.) of ice cooled and mechanically stirred 60% oleum. The mixture was then slowly heated on a water bath until vigorous evolution of carbon dioxide began. This occurred at 60°–70° C. Some sulfamic acid precipitated in the course of the reaction. The reaction mixture was ice cooled after the carbon dioxide ceased to evolve. Impure sulfamic acid could be obtained at this stage by filtering the reaction mixture on a sintered glass funnel. It was preferable, however, to pour the reaction mixture onto a limited quantity of ice, as the sulfamic acid formed has a low solubility in a fairly concentrated solution of sulfuric acid. The product, which was collected on a sintered glass funnel, was practically pure after being washed with methanol and ether and did not give a sulfate test. It weighed 3.4 g., representing a yield of 63%. The sulfamic acid formed had a melting point of 197°–203° C. dec.

Example 2

The same reaction as described in Example 1 was carried out but this time 23.0 g. of 30% oleum were employed with 5.0 g. of ethyl carbamate. Carbon dioxide was noted to evolve at 70°–80° C. The yield of sulfamic acid obtained was 23%.

Example 3

6.6 g. of sec-butyl carbamate were added gradually to 26.4 g. of ice cooled and mechanically stirred 60% oleum. Evolution of carbon dioxide occurred readily in the cold. The reaction mixture was then poured onto ice. Sulfamic acid was formed in 22% yield.

Example 4

6.6 g. of ethyl N-ethylcarbamate were added gradually to 39.0 g. of ice cooled and mechanically stirred 60% oleum. The mixture was then slowly heated on a water bath until vigorous evolution of carbon dioxide occurred, which was at about 60° C. After gas evolution had ceased, the reaction mixture was ice cooled and poured slowly into 250 ml. of cold ether. The materials were shaken and cooled in an ice bath during the mixing. The precipitated ethyl sulfamic acid was collected on a sintered glass funnel and washed with 200 ml. of ether, whereupon it gave only a very faint sulfate test. The product weighed 4.9 g. which represented a 70% yield. For further purification the solid was dissolved in a little methanol and reprecipitated by the addition of a much larger volume of ether. The sulfate-free material melted at 171°–172° C.

A small quantity of red viscous oil, that could not be induced to solidify, separated from the combined ether filtrate and washings used in the original isolation. This oil contained the very hygroscopic ethylamine acid sulfate. It is advisable to use a limited quantity of ether for precipitation of ethylsulfamic acid from the reaction mixture, in order to prevent serious contamination by ethylamine acid sulfate, which separates out on greater dilution; the yield of ethylsulfamic acid is, however, thereby reduced somewhat.

Example 5

5.8 g. of ethyl N-methylcarbamate were added gradually to 32.3 g. of ice cooled and mechanically stirred 60% oleum. The mixture was then slowly heated on a water bath until vigorous evolution of carbon dioxide began. This was at about 60° C. After gas evolution had ceased, the reaction mixture was ice cooled and poured slowly into chilled ether. The materials were shaken and cooled in an ice bath during the mixing. The quantity of ether used in the separation of methylsulfamic acid was limited to 200 ml. so as to avoid contamination by methylamine acid sulfate, which appeared as an oil on greater dilution. The resulting solid methylsulfamic acid was recrystallized by dissolving it in a little methanol and then reprecipitating it by the addition of a much larger volume of ether. The purified methylsulfamic acid melted at 179° C.

While the invention has been described in detail and shown with respect to the accompanying examples, it is not to be limited thereto, since many changes and modifications may be made in the invention without departing from the spirit and scope thereof. Hence, it is desired to cover any and all forms and modifications of the invention which may come within the language and scope of any one or more of the appended claims.

I claim:

1. The process of preparing a compound having the general formula $$RNHSO_3H$$

including the step of reacting with oleum a compound having the general formula $$RNHCOOR'$$

where in both compounds R is a member of the class consisting of hydrogen and a lower alkyl group and R' is a member of the class consisting of primary and secondary alkyl groups.

2. A method of preparing sulfamic acids of the general formula:

$$RNHSO_3H$$

wherein R is a radical taken from the class consisting of H, methyl and ethyl which comprises mixing a carbamic ester of the general formula:

$$RNHCOOR'$$

wherein R' is an alkyl radical having 1 to 4 carbon atoms with oleum having a sulfur trioxide content substantially greater than 5%.

3. A method according to claim 2 in which the sulfur trioxide content is substantially greater than 20%.

4. A method according to claim 3 in which the mixture as it is made is cooled and then heating said mixture to complete the reaction.

5. A method according to claim 3 in which there is added to the reacted mass a sufficient amount of ether to cause precipitation of the sulfamic acid.

6. The process of preparing sulfamic acid by reacting ethyl carbamate with oleum having a sulfur trioxide content not appreciably less than 20%.

7. The process of preparing sulfamic acid by reacting sec-butyl carbamate with oleum having a sulfur trioxide content not appreciably less than 20%.

8. The process of preparing ethyl sulfamic acid by reacting ethyl N-ethyl carbamate with oleum having a sulfur trioxide content not appreciably less than 20%.

9. The process of preparing methyl sulfamic acid by reacting ethyl N-methyl carbamate with oleum having a sulfur trioxide content not appreciably less than 20%.

References Cited in the file of this patent

UNITED STATES PATENTS 2,102,350     Baumgarten     Dec. 14, 1937

OTHER REFERENCES

Linhard-Justus Liebigs Annalen der Chemie, vol. 535, pp. 267–284 (1938).